United States Patent
Dymetman

(10) Patent No.: US 7,593,144 B2
(45) Date of Patent: Sep. 22, 2009

(54) CONTROLLING SCANNING AND COPYING DEVICES THROUGH IMPLICIT GESTURES

(75) Inventor: Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 928 days.

(21) Appl. No.: 11/168,116

(22) Filed: Jun. 28, 2005

(65) Prior Publication Data

US 2006/0291004 A1    Dec. 28, 2006

(51) Int. Cl.
*H04N 1/04* (2006.01)
(52) U.S. Cl. .............. 358/474; 358/488; 358/497; 382/107; 382/217; 348/208.4; 399/362
(58) Field of Classification Search ......... 358/474–498; 382/107, 173, 217, 278, 307; 399/362; 348/206, 348/208.4
See application file for complete search history.

(56) References Cited

U.S. PATENT DOCUMENTS

| | | | |
|---|---|---|---|
| 4,954,846 A | | 9/1990 | Matsuo et al. |
| 5,798,841 A | * | 8/1998 | Takahashi ............ 358/296 |
| 6,340,979 B1 | | 1/2002 | Beaton et al. |
| 6,388,773 B1 | * | 5/2002 | Smith et al. ............ 358/473 |
| 6,697,536 B1 | * | 2/2004 | Yamada .................. 382/275 |
| 7,170,659 B2 | * | 1/2007 | Jones ..................... 358/496 |
| 2003/0165276 A1 | * | 9/2003 | Seeger et al. ............ 382/278 |
| 2004/0227980 A1 | * | 11/2004 | Chueh .................... 358/474 |

OTHER PUBLICATIONS

Tapping Technology—A Copier for the Rest of Us—Feb. 1998 http://www.mdtap.org/tt/1998.02/3-copier.html; accessed May 11, 2005.

* cited by examiner

*Primary Examiner*—Kimberly A Williams
(74) *Attorney, Agent, or Firm*—Fay Sharpe LLP

(57) ABSTRACT

A scanning machine (10) includes a scan surface (12) for receiving a page or pages to be scanned. A motion detector (20) monitors the copy surface to detect movement of the pages. In response to detecting a cessation of motion on the scan surface, the motion detector generates a trigger signal which causes a capture circuit (30) to capture an image of a page on the scan surface. If, during the capture of the page image, the motion detector detects motion of the page, the motion detector generates an abort signal which terminates capture of the image and empties a buffer memory (32). Once cessation of motion of the page is again detected, another trigger signal is issued and another attempt is made to capture an image. In this manner, scanning is started and stopped by natural, simple gestures without the operator pushing buttons.

15 Claims, 2 Drawing Sheets

CONTROLLING SCANNING AND COPYING DEVICES THROUGH IMPLICIT GESTURES

BACKGROUND

The present application relates to the reproduction arts. It finds particular application in conjunction with photocopiers and xerographic devices and will be described with particular reference thereto.

When operating a photocopy machine in a single copy mode, the operator commonly places the open page of a book or sheet of paper on a copy glass and positions it to the satisfaction of the operator. When copying pages of an article from a bound text, the operator commonly presses the binding towards the glass with one hand during the copying process. If the operator initially presses the binding with the hand closest to a copy or start button, depressing the start button is awkward. The operator might switch the hand that is holding the binding towards the glass, reach across with the other hand, depress the button with an elbow, or engage in another awkward or time-consuming move to start the copy process. When copying multiple pages of an article, the operator repeats the operation of positioning the text and depressing the start or copy button for every page copied.

This repetitive process tends to be labor intensive and sometimes awkward. Sometimes the text shifts during the copying process, resulting a blurred or defective copy. Typically, after the text shifts, the copying process must still be completed before the text can be repositioned and recopied, which wastes paper, toner, and time.

The present application overcomes the above-referenced problems and others.

BRIEF DESCRIPTION

The present application proposes to allow automatic detection of the movement of a document against a copier/scanner glass in order to automatically perform a scanning/copying operation. The human operator can take advantage of this detection to communicate in simple ways with the device: movement of the document of paper followed by stillness is interpreted as an instruction to start the scanning process; movement of the document during the scanning process is interpreted as an instruction to stop the scanning process and restart. The advantage of this approach is that the operator does not need to push the start button anymore, but implicitly instructs the copier through natural, simple, gestures, which have an obvious implicit content.

In accordance with one aspect, a method of generating an image is provided. A region to be imaged is monitored for motion. In response to monitoring a cessation of motion in the region, capture of an image of the region is triggered.

In accordance with another aspect, an apparatus for generating an image is provided. A means monitors a region to be imaged for motion. Another means triggers capture of an image of the region in response to monitoring a cessation of motion in the region.

In accordance with another aspect, a scanning apparatus is provided. The scanning apparatus includes a scan surface for receiving pages to be scanned. A motion detector detects motion on the scan surface and generates a trigger signal in response to detecting a cessation of motion on the scan surface. A circuit captures an image of a page on the scan surface in response to the trigger signal.

One advantage resides in relieving the operator of the task of depressing the start or scan button for each of multiple pages copied.

Another advantage is that the scanning of multiple pages is expedited.

Another advantage resides in the elimination of blurred or defective copies when the page moves during a scanning process.

Another advantage is that the operator can stop a scan in progress for any reason through a simple gesture—moving the page.

Still further advantages will be appreciated to those of ordinary skill in the art upon reading and understanding the following detailed description.

BRIEF DESCRIPTION OF THE DRAWINGS

The drawings are only for purposes of illustrating the exemplary embodiments and are not to be construed as limiting.

DETAILED DESCRIPTION

Figure 1:
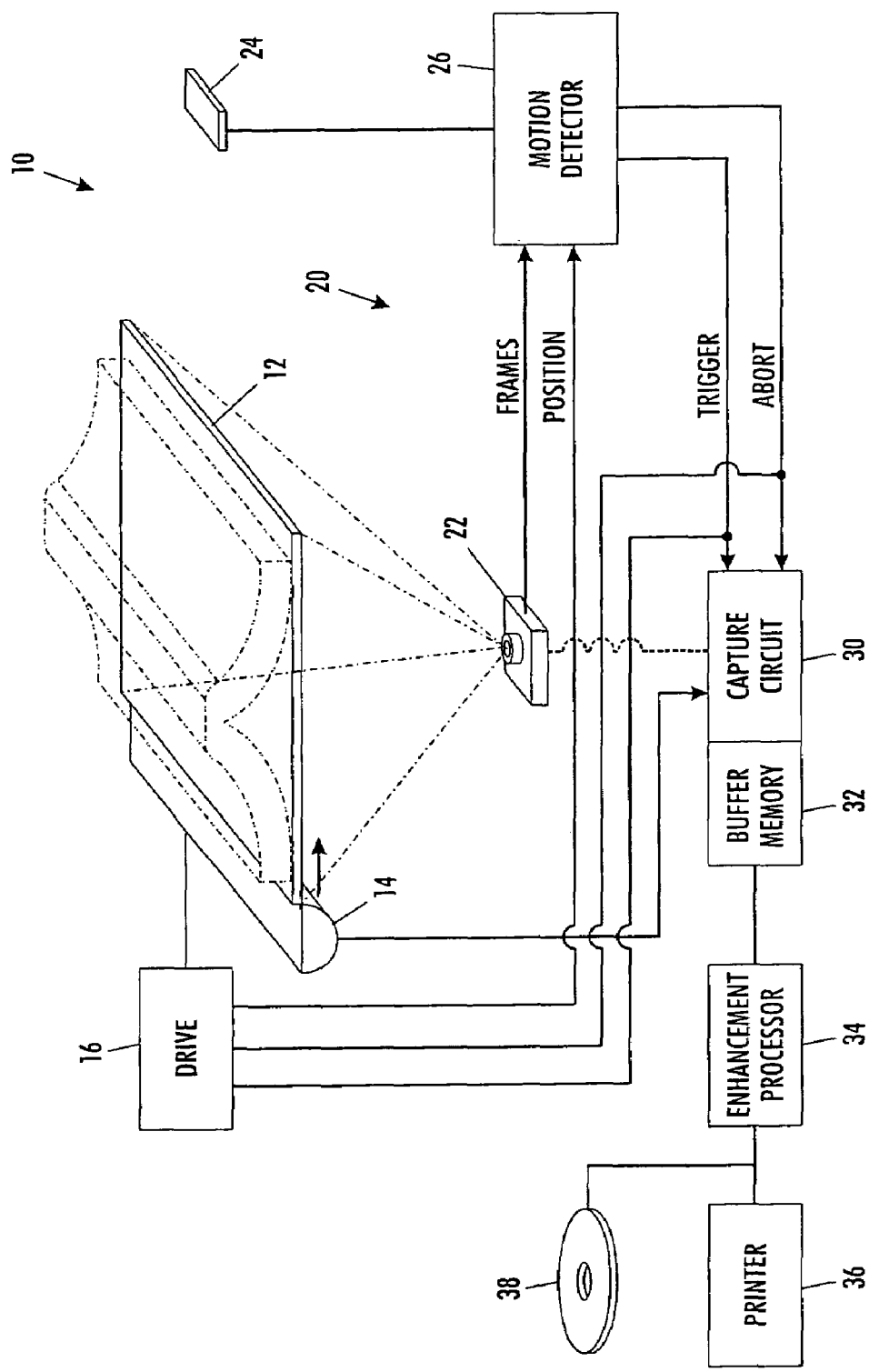
FIG. 1 is a diagrammatic illustration of a scanning system.

A scanning machine 10 includes a glass or transparent scan surface 12 against which the material to be copied is placed. To capture an image, a scanning bar 14 is moved along an underside of the scan surface 12 by a drive 16. Typically, the scanning bar 14 includes a light source and an array of photodetectors which scan a line or band of the scanned item as the drive 16 moves the scanning bar uniformly across the page to be scanned.

A motion detection system 20 monitors the scan surface 12 to determine whether and when a page to be scanned is stationary or moving. More specifically to the illustrated embodiment, a digital camera 22 views the copy surface from the underside and takes digital photographs of the scanned page at regular intervals. The regular intervals can be, for example, the 30 frames/minute common to video cameras or a longer time period such as $\frac{1}{10}^{th}$ second or even a second. When enabled by an enable button or other device 24, a motion detection circuit 26 receives the stream of digital images from the digital camera 22 and determines whether the page on the copy surface is moving or stationary.

When the motion detection circuit determines that the page to be scanned has remained stationary for a preselected period of time, e.g., 1 second, it sends out a trigger signal to start the image capture process. More specifically, the trigger signal causes the drive 16 to commence moving the scan bar 14 along the scan surface and initializes an image capture circuit 30. As the scan bar moves along the page to be scanned, the capture circuit loads the acquired information into a buffer memory 32. Optionally, an enhancement processor 34 operates on the acquired image with one or more image enhancement algorithms to improve the image quality. In a photocopier, the enhanced digital image is then forwarded to a printer 36 which prints a copy of the page on the scan surface. Alternately, the enhanced image is set to another device for faxing, recording, or creating a physical representation of the image, for example, a computer disk or memory 38 which stores the scanned image, a microfilm filming device, or the like.

Once the scan starts, the motion detector 20 continues to monitor the page to be scanned. If the motion detector detects motion of the scanned page during the scan, the motion detection circuit issues an abort signal. In one embodiment, the abort signal causes the drive 16 to return the scan bar to the initial or rest position and causes the image capture circuit 30 to empty or erase the buffer memory 32 of the partially scanned image. Once the scan bar returns to the initial position and the motion detector 20 detects that the page to be scanned has remained stationary for the preselected time, another trigger signal is generated.

In this manner, as the operator places page after page, or sheet after sheet, of material to be copied on the copy surface 12 and holds it stationary for the preselected duration, the scanning process starts automatically. If the page moves during scanning, the improperly scanned page is automatically scanned again. Both the scanning and the stopping of scanning is triggered based on the detected motion or lack thereof without the manual operation of depressing a stop or start button. This not only prevents the generation of blurred images, but enables the operator to stop a scan by implicit gestures without pressing buttons.

Figure 2:
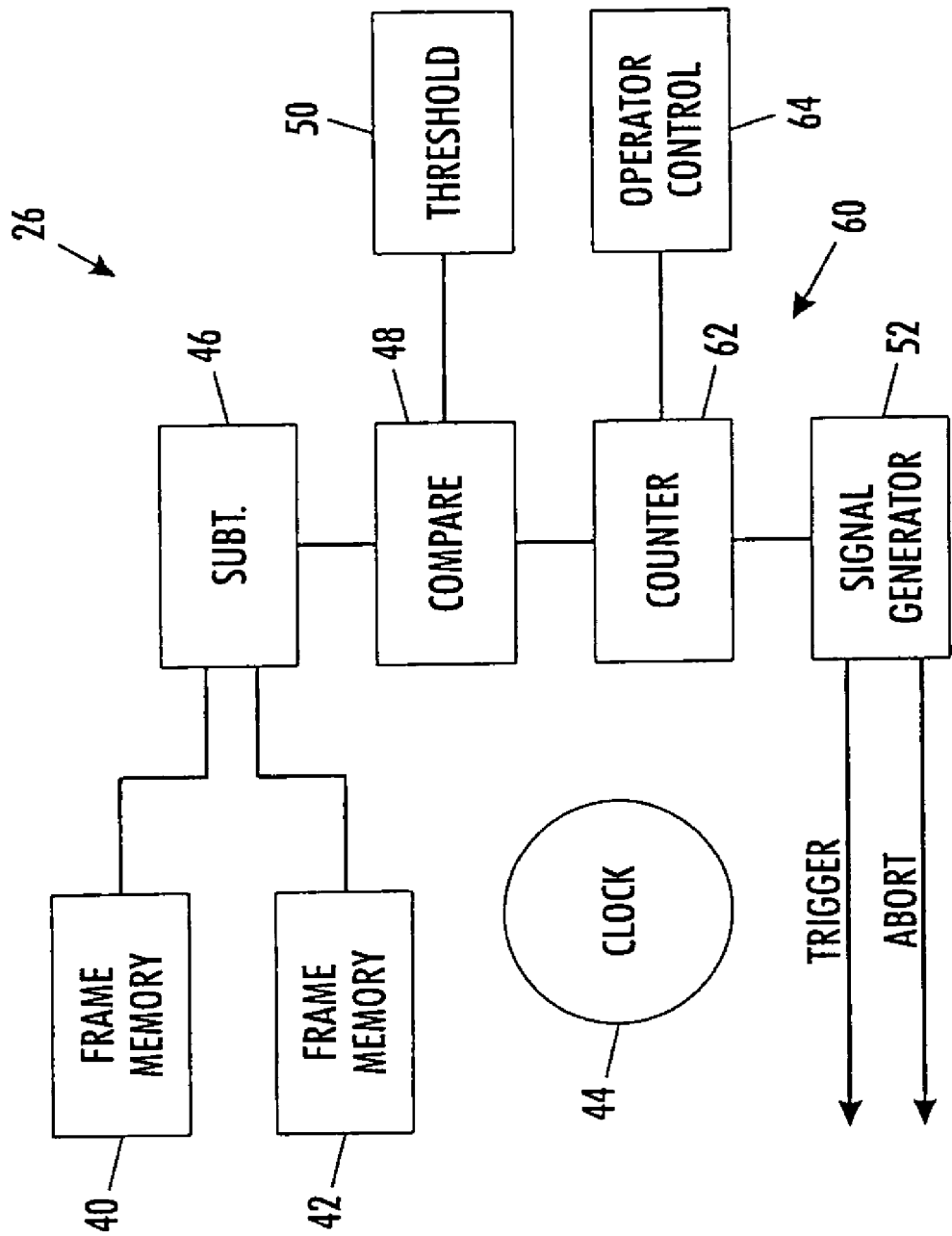
FIG. 2 is a diagrammatic illustration of an exemplary motion detector system for use in the system of FIG. 1.

With reference to FIG. 2, an exemplary motion detection circuit 26 includes a pair of frame memories 40, 42. As a clock 44 clocks the digital camera (22 shown in FIG. 1), successive digital images are sent alternately to the frame memories 40, 42. A subtraction circuit 46 subtracts each pair of digital images to generate a difference image. If the page is stationary, both captured digital images should be substantially identical and the digital image should be substantially blank. If blank is assigned a value of zero, the sum of all image pixels will be near zero when the page is stationary. Alternately, if the page is moving, the difference image will be significant and the sum of all pixels a larger number. A comparing processor or circuit 48 compares the difference image with a threshold 50. If the difference image or the sum of its pixels is below the threshold, then this information is sent to a trigger/abort signal generator 52. If the scanner is not in the process of copying and the comparison indicates that the page is stationary, the signal generator 52 generates the trigger signal. If the image capture or drive circuit indicates to the signal generator that a scan is in process and if the comparing circuit detects a difference image indicative of significant motion, then the signal generator generates the abort signal. Numerous other motion detection schemes are also contemplated.

In the illustrated embodiment in which the scan bar 14 moves between the camera 22 and the scan surface 12, the scan bar is filtered out of the compared images. For example, the known or monitored position of the scan bar and its width can be used to zero the portions of the subtracted images or the difference image that is attributable to the scan bar. As another example, if the image acquisition rate of the camera 22 is high relative to the speed of the scan bar, the difference image for a stationary page will be blank except for lines at the leading and trailing edges of the scan bar. The threshold for motion during imaging can be set higher than this pair of lines. Alternately, because the location of the scan bar edge lines is known, they can be filtered from the difference image.

Optionally, the motion detection circuit 26 includes circuitry 60 for adjusting the time period that the page must remain stationary before the trigger signal is generated. In the illustrated embodiment, the time adjustment circuit includes a counter 62 which counts the number of difference pictures which are the same and signals the signal generator when that count reaches a selected number. An operator input device or control 64 enables the operator to adjust how long the page is to remain stationary before the scan is triggered, in the illustrated embodiment, by adjusting the count which signals the signal generator to send the trigger signal.

In an alternate embodiment, the digital camera 22 also captures an image of the page to be copied. While detecting motion, the camera 22 might take images at a rate that produces a relatively low image quality. Once the page is determined to be stationary, then the camera 22 is operated in a manner to attain a higher resolution image. For example, the exposure might be longer, illumination levels might be increased, or the like. As another alternative, a plurality of digital images might be acquired by the digital camera and summed or otherwise combined by the image capture circuit 30 to generate the final digital image for printing or retention.

This same system may also find application in conjunction with photography. For example, rather than setting a timer to enable the photographer to be in a group picture, a digital camera analogous to digital camera 22 includes a motion detection circuit 26 which determines whether there is motion above a threshold in the image which is being received. This threshold is set such that the motion of the photographer moving across the picture to a posing position prevents the camera from capturing the image. When the motion detection circuit 26 determines that the subjects are sufficiently still, it triggers an image capture circuit 30 to capture the digital image for storage in memory.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of generating an image comprising:
monitoring a region to be imaged for motion;
in response to monitoring a cessation of motion in the region, moving a scanning bar across the monitored region and generating an electronic representation of portions of the region;
storing the electronic representation;
as the scan bar moves across the region, continuing to monitor for motion;
in response to monitoring motion, (i) terminating movement of the scan bar and returning the scan bar to a rest position, and (ii) erasing the stored electronic image representation.

2. The method according to claim 1 further including:
using the electronic representation to control printing a document carrying a human readable image of the region.

3. The method according to claim 1 further including:
after the scan bar returns to the rest position and the electronic image representation is erased, continuing to monitor the region for motion;
in response to a cessation of motion, moving the scan bar across the region and generating the electronic representation.

4. A method of generating an image comprising:
generating a series of lower quality digital image frames of at least a portion of a region to be imaged;
analyzing successive lower quality image frames to determine a presence or absence of motion in the region;
in response to determining an absence of motion in the region, capturing a higher quality digital image of the region; and
at least one of storing and printing the captured higher quality digital image.

5. The method according to claim 4 wherein analyzing the successive frames includes:
subtracting successive frames to generate a difference image;

comparing the difference image with a threshold to determine motion or absence of motion.

6. The method according to claim 4 further including:
positioning a page to be imaged in the region to be imaged;
upon determining an absence of motion of the page, capturing the higher quality image of the page.

7. The method according to claim 6 further including:
while capturing the higher quality image of the page, continuing to monitor for motion;
upon detecting motion of the page, aborting the capturing of the higher quality image.

8. The method according to claim 6 further including:
removing the first page from the region and positioning a second page in the region;
upon detecting the absence of motion of the second page, capturing a higher quality image of the second page, whereby higher quality images of a plurality of pages are captured in response to each page being stationarily positioned in the image region.

9. The method according to claim 4, wherein capturing the higher quality digital image includes moving a scan bar across the region;
wherein the higher quality image is captured as the scan bar moves;
in response to detecting motion during the capture of the higher quality image, returning the scan bar to a rest position.

10. An apparatus for generating an image comprising:
a means for monitoring a region to be imaged for motion;
a means for triggering a drive to move a scan bar across the region, in response to monitoring a cessation of motion in the region;
a means for capturing an image of the region as the scan bar moves across the region.

11. A scanning apparatus comprising:
a scan surface which receives pages to be copied;
a motion detector which detects motion on the scan surface and generates a trigger signal in response to detecting a cession of motion on the scan surface;
a scan bar which converts portions of a page on the copy surface into an electronic representation; and,
a drive which moves the scan bar across at least a portion of the scan surface, the drive moving the scan bar across the scan surface following generation of the trigger signal.

12. The apparatus according to claim 11 wherein the motion detector continues to monitor the scan surface as the drive moves the scan bar across the scan surface and further including:
in response to the motion detector detecting motion on the scan surface, the motion detector generates a signal which causes the drive to cease moving the scan bar.

13. The apparatus according to claim 11 further including:
a memory which stores the electronic representation of the image.

14. The apparatus according to claim 13 further including a printer which receives the electronic representation of the captured image from the memory and converts the electronic representation into a human readable print.

15. The apparatus according to claim 11 wherein the motion detector includes:
a digital camera which generates a series of digital image frames; and,
a motion detection circuit which receives and analyzes the series of digital image frames to determine motion or a cessation of motion.

* * * * *